Figure 1:
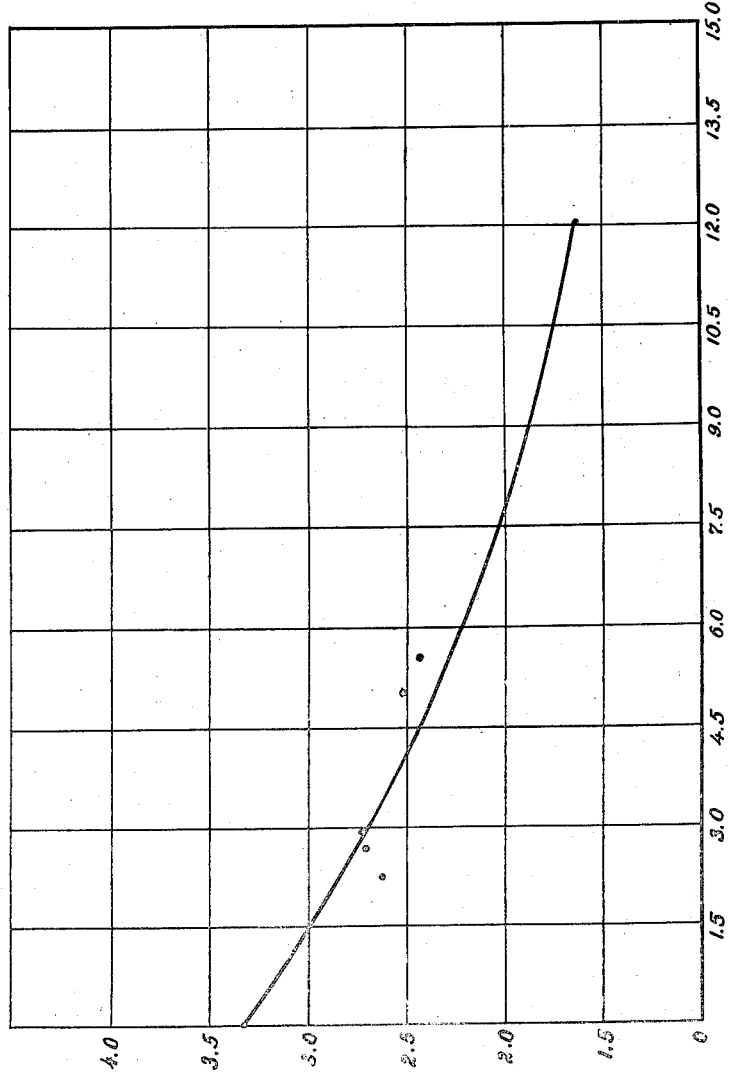

March 30, 1948.  J. R. MEADOW ET AL  2,438,874
SEPARATION OF ASPHALT FROM HYDROCARBONS
Filed Dec. 16, 1944  2 Sheets-Sheet 1

INVENTORS
JACOB R. MEADOW
EBENEZER EMMET REID
By Francis F. Johnston
ATTORNEY

March 30, 1948.   J. R. MEADOW ET AL   2,438,874
SEPARATION OF ASPHALT FROM HYDROCARBONS
Filed Dec. 16, 1944   2 Sheets-Sheet 2

INVENTORS
JACOB R. MEADOW
EBENEZER EMMET REID
By Francis J. Johnston
ATTORNEY

Patented Mar. 30, 1948

2,438,874

UNITED STATES PATENT OFFICE 2,438,874

SEPARATION OF ASPHALT FROM HYDROCARBONS

Jacob R. Meadow, Memphis, Tenn., and Ebenezer Emmet Reid, Baltimore, Md., assignors to Socony-Vacuum Oil Company, Incorporated, a corporation of New York Application December 16, 1944, Serial No. 568,516

3 Claims. (Cl. 196—22)

The present invention relates to treatment of hydrocarbons admixed with asphalt for the separation of the latter and, more particularly, to the treatment of petroleum oils containing asphalt.

The term "asphalt" is used in the petroleum industry to designate the semi-solid or solid residuum left in stills after the volatile fractions have been removed from an asphalt-bearing crude. If, however, the distillation is carried still further so as to decompose or crack the asphalt as well as to distill all of the volatile fractions, the residue is known as coke ("Chemical Refining of Petroleum," Kalichevsky and Stagner, Monograph series, 2nd ed. 1942, p. 42). Abraham ("Asphalts and Allied Substances," fourth edition, D. Van Nostrand Co.), suggests in his book that asphalt may be "a multitude of chemical substances, each having a definite molecular composition. These constituent substances may be associated as a simple solution of liquids in liquids, or solids in liquids; or in the form of a colloidal solution; or as a solid solution of amorphous or crystalline solids; or as an emulsion of immiscible liquids; or as a suspension of insoluble substances in a more or less liquid matrix; or combinations of two or more of the foregoing phases." . . . "The colloidal nature of asphalt is confirmed by the Tyndall effect, the Brownian movement observed under the ultra-microscope even in dilute solutions, the fact that on distillation no trace of asphaltic or coal-like substances are found in the distillate, and the further fact that asphaltenes retain hydrogen even at 800° F." (pages 65-66). Abraham further states: "The stability of the 'system' depends upon the respective surface tensions of the 'medium' and 'micelle.' Changes in the stability, including 'flocculative' and 'peptizing' reactions, give rise to a 'reversible flocculation.' If, however, the micelle itself is destroyed and cannot be directly repeptized, the substance is said to have undergone an 'irreversible flocculation.' The latter is caused by chemical reactions (e. g. iodine, chlorine, etc.); by heat; or by exhaustive extraction of asphaltenes with different solvents of successively higher surface-tension. . . ." (page 66).

The problem of removing asphalt from petroleum oil has been one which has confronted the industry for a number of years. Heretofore, deasphalting of crude petroleum has been obtained by methods such as distillation, solvent precipitation, and treatment with clay, sulfuric acid and metallic chlorides.

Kalichevsky and Stagner in a discussion of solvent refining in "Chemical Refining of Petroleum" (Monograph series 2nd ed. 1942, pages 329–332) state that at present propane is the only deasphalting solvent of commercial importance.

In the light of the foregoing excerpts from authoritative discussions of asphalt and the deasphalting of petroleum it is manifest that there is no basic hypothesis which explains the mechanism of the various methods for deasphalting petroleum. Furthermore, it has been recognized that none of the methods for deasphalting petroleum are wholly satisfactory although the art has struggled with the problem for many years.

It has now been discovered that mixtures of hydrocarbons and asphaltic bodies and, particularly, crude petroleum oil and fractions thereof can be deasphalted in a simple efficacious manner to produce a deasphalted "raffinate" and an asphalt which has many characteristics different from those of asphalts and residues obtained by other methods of separation.

Figure 2:
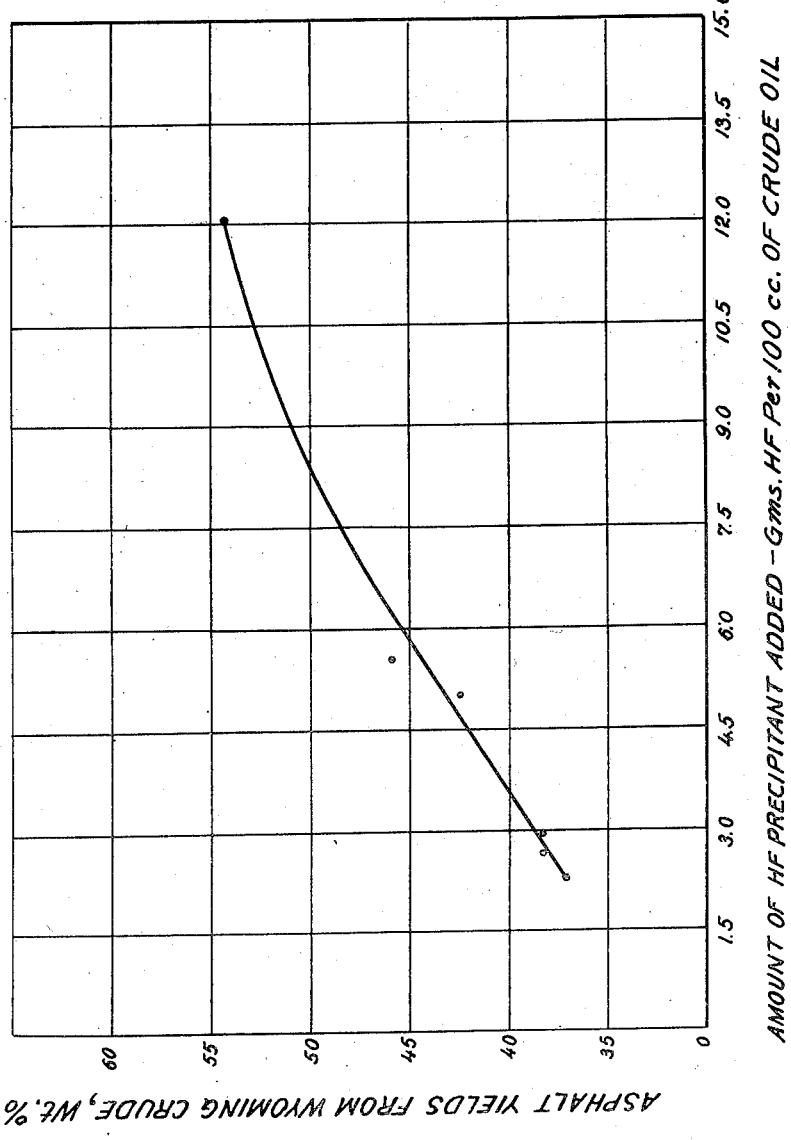

It is an object of the present invention to provide a process for deasphalting hydrocarbons admixed with asphalt. It is another object of this invention to provide a means for deasphalting crude petroleum and petroleum fractions. It is a further object of the present invention to provide a method for treating crude petroleum to deasphalt the same and produce a deasphalted stock suitable for cracking without distillation. Other objects and advantages will become apparent to those skilled in the art from the following description taken in conjunction with drawings in which Figure 1 is a graph showing the relation between the amount of treating agent employed to deasphalt a crude and the sulfur content of the deasphalted crude and Figure 2 is a graph showing the relation between the amount of treating agent employed to deasphalt a crude and the amount of asphalt separated from the crude.

Before describing the present method for deasphalting hydrocarbon mixtures a discussion of the mechanism which at this time seems to be involved will be given although those skilled in the art will understand that this is an hypothesis which appears to explain the novel results produced but is not limiting. It may be assumed that the treating agent acts as a flocculating agent and produces a condition of "reversible flocculation." The asphaltous acids, their anhydrides, and other protective bodies in the "lyophilic portion" are probably neutralized temporarily by the treating agent and this results in flocculation of the asphalt. This seems to be a satisfactory explanation of the mechanism for two reasons at least. (1) A given weight of treating agent will flocculate from 10 to 15 times its own weight in the form of asphalt. (2) A sample of the flocculated asphalt (free from all traces of treating agent or precipitant) can be redissolved, i. e., redispersed in an equal weight of "raffinate" free from precipitant at room temperature. In other words, the asphalt readily goes back into solution in the absence of the precipitant. This latter fact clearly demonstrates that the flocculation of the asphalt is a reversible flocculation. Since the flocculated or precipitated asphalt is readily dispersed in the medium from which it has been flocculated when the medium is free from the flocculating agent it is manifest that the composition of the asphalt is practically unchanged. It is well known that when the dispersed substance of a colloidal solution is acted upon by the flocculating agent even mildly the substance cannot readily be dispersed and. generally, cannot be redispersed.

Sulfuric acid has been used in deasphalting petroleum and some features of its action appear analogous to the action of the flocculating agent of the present process. On the other hand, there are several distinct differences between the effects produced by sulfuric acid and the novel flocculating agent.

(1) To produce a noticeable deasphalting effect a considerably larger amount of sulfuric acid is necessary than is necessary employing the precipitant of the present invention.

(2) The sludge or coagulate produced when sulfuric acid is used as the coagulant is lumpy and more difficult to handle.

(3) The sulfuric acid sludge or coagulate is not readily dispersed in the "raffinate."

(4) Sulfuric acid produces at least two undesired chemical effects upon the asphalt:

(a) It sulfonates readily.

(b) It is a strong oxidizing agent.

In view of the foregoing discussion of the composition of asphalt, the prior methods for deasphalting petroleum, the deficiencies of prior methods and the differences between prior precipitants and the present flocculant, it is believed established that the present precipitant satisfies a demand for a means of deasphalting hydrocarbon mixtures which has confronted the art for some time.

In general, the present method involves breaking the colloidal solution in which asphalt is the dispersed phase by the use of a coagulant or precipitant or flocculating agent or broadly a treating agent which is recovered readily when desirable. The treating agent is used in gaseous or liquid form. The treating agent or flocculating agent is used in amounts of about 1% to about 3% by weight based upon the weight of the hydrocarbon mixture and at temperatures at which the hydrocarbon mixture is fluid, say temperatures of about 50° F. to about 150° F. After the precipitant has been thoroughly mixed with the hydrocarbon mixture, the treated mixture is allowed to stratify and the asphalt separated from the non-asphaltic material. It is desirable to treat the flocculated asphalt to recover the same free from treating agent since the product so obtained provides a novel asphalt. Removal and recovery of the treating agent is readily achieved by heating or by passing an inert gas through the molten asphalt or both. The deasphalted hydrocarbons when of suitable character and properties may be used directly without further treatment as charging stock for a cracking operation, particularly a catalytic cracking operation.

The flocculation of the asphalt contained in a hydrocarbon mixture can be carried out in a closed or an open container at ambient temperatures or at elevated temperatures. For example, a given volume of hydrocarbons containing asphalt say about 100 parts by volume may be placed in an open container and about 0.8 to about 12 parts by volume of precipitant thoroughly mixed therewith. The thoroughly mixed conglomerate is then allowed to settle. This usually requires in excess of 15 minutes. After the flocculated asphalt has settled the top layer of deasphalted hydrocarbons is removed in any suitable manner, for example by decantation and is ready for further processing such as cracking or distillation.

The flocculated asphalt is a desirable product and is freed of precipitant by passing an inert gas through the asphalt while the asphalt is fluid or molten.

In some instances the separation of the asphalt from the deasphalted hydrocarbons is facilitated by the use of a small volume of hydrocarbon diluent. The hydrocarbon diluent need not be used in amounts greater than about 50 to 120 volume per cent and amounts of about 8 volume per cent to about 12 volume per cent usually are sufficient. Petroleum ether, naphtha, propane and similar hydrocarbons may be used as diluents and it is to be noted that while in the propane deasphalting process large quantities of propane are used, sometimes as much as 900 volume per cent, the amount of diluent used in the present process is very small and not critical.

The diluent may be added to the hydrocarbon mixture before treatment with the precipitant, during treatment or after the hydrocarbon mixture and flocculating agent have been thoroughly mixed. However, it is preferred to add the diluent to the hydrocarbon mixture before treatment.

As a means of illustrating the principles of the present invention and for the guidance of those skilled in the art the following non-limiting examples of a preferred procedure are provided.

Illustrative of the treatment of a heavy crude to remove asphalt by the present method is the treatment of Wyoming Black crude from the Ten Sleep and Poison Spider fields.

The Wyoming Black crude was treated at room temperature with various amounts of precipitant, in this instance hydrogen fluoride, in the presence of about 8 volume per cent to about 13 volume per cent of a diluent, petroleum ether. The results are partially tabulated in Table I:

asphalt and associated material flocculated increases.

TABLE I

| Experiment No. | Vol. Per Cent of Diluent Used (Vol. Pet. Ether/100 cc. Crude Oil) | Gms. HF/100 cc. Crude Oil | Vol Per Cent HF | Yield of Vol. Per Cent | Raffinate Wt. Per Cent | Yield of Asphalt | | Sulfur Content of Raffinate, Wt. Per Cent | A. P. I. Gravity of Raffinate | Remarks |
|---|---|---|---|---|---|---|---|---|---|---|
| | | | | | | Vol. Per Cent | Wt. Per Cent | | | |
| Original Oil | 0 | None | None | 100 | 100 | | | 3.32 | 18.0 | Untreated oil. |
| 11 | 11.7 | 0.82 | 0.83 | (¹) | | | | | | Insufficient HF to cause complete coagulation of asphalt. |
| 18 | 8.5 | 2.30 | 2.32 | 65.2 | 62.8 | 34.8 | 37.2 | 2.61 | 23.9 | |
| 12 | 10.9 | 2.66 | 2.69 | 64.0 | 61.7 | 36.0 | 38.3 | 2.70 | 23.4 | |
| 10 | 12.8 | 2.96 | 3.00 | 64.8 | 62.7 | 35.2 | 37.3 | 2.72 | 22.6 | |
| 13 | 10.9 | 4.96 | 5.04 | 60.3 | 57.5 | 39.7 | 42.5 | 2.53 | 25.5 | |
| 15 | 10.5 | 5-6 | 6.07 | 57.0 | 54.0 | 43.0 | 46.0 | 2.44 | 26.2 | Approx. Wt. of HF added=5.0 to 6.0 gms. |
| 14 | 10.9 | 12.1 | 12.24 | 49.0 | 45.7 | 51.0 | 54.3 | 1.64 | 28.2 | |

¹ Poor separation.

It will be noted that less than one volume percent of precipitant, hydrogen fluoride, does not cause complete coagulation of the asphalt. It will also be observed that the sulfur content of the "raffinate" remains substantially constant and that the action is not a desulfurizing action essentially since only about 20% of the sulfur present in the crude is removed with the asphalt whereas in a desulfurizing treatment with hydrogen fluoride up to 70% of the sulfur can be removed. The yield of asphaltic material increases somewhat with the use of increased amounts of precipitant. This latter result is probably caused by two effects when relatively large amounts, i. e. in excess of 3%, of hydrogen fluoride are used, (1) the amount of hydrogen fluoride in excess of that necessary for precipitation of the asphalt has some solvent action on the oil-soluble sulfur compounds in the "raffinate" phase (or petrolene medium according to Abraham) and (2) there is some mutual solvent action of the hydrogen fluoride between the two phases which results in an indefinite separation of the two layers.

This effect is shown graphically in Figure 1 in which the amount of sulfur remaining in the deasphalted oil is plotted against the amount of hydrogen fluoride employed. As the amount of hydrogen fluoride per unit volume of oil is increased from zero to 12.1 grams (12.24 volume %) the sulfur content of the deasphalted oil decreases from 3.32% to 1.64%. Examination of the data of Table I makes it manifest that increasing the amount of precipitant above about 3% to an amount less than the amount to produce the solvent effect of hydrogen fluoride does not increase the yield of asphalt to an appreciable extent and does not reduce the sulfur content of the "raffinate" appreciably. Thus, the use of 3 volume per cent of hydrogen fluoride reduces the sulfur content of the "raffinate" about 18% while treatment with 5 volume per cent decreases the sulfur content only 24%. In other words, the last two per cent of hydrogen fluoride is only about half as effective as the first three per cent. Furthermore, the first three per cent of hydrogen fluoride removes about 81% of the asphalt while the last two per cent only removes about 20% of the asphalt.

Figure 2 graphically depicts the relation between the yield of asphalt and associated material and the amount of flocculent, in this instance hydrogen fluoride. As the amount of precipitant employed is increased the amount of

TABLE II

Comparison of Wyoming crudes before and after asphalt coagulation

| | Untreated Wyoming Black Crude | Wyoming Crude After Asphalt Removed ¹ |
|---|---|---|
| A. P. I. Gravity | 18.0 | 25.5. |
| Specific Gravity | 0.9465 | 0.9013. |
| Sulfur Content, Wt. per cent. | 3.32 | 2.53. |
| Carbon Residue, Wt. per cent. | 6.1 | 3.7. |
| Distillation: | | |
| I. B. P., °F | 760 mm. 314 | 760 mm. 212. |
| 5% | 760 mm. 424 | 760 mm. 393. |
| 10% | 760 mm. 456 | 760 mm. 450. |
| 20% | 760 mm. 514 | 760 mm. 531. |
| 30% | Vacuum Assay | 760 mm. 594. |
| 40% | Vacuum Assay 723 (Cor. to 760 mm.). | 760 mm. 644. |
| 50% | Vacuum Assay 810 (Cor. to 760 mm.). | 760 mm. 667. |
| 60% | Vacuum Assay 920 (Cor. to 760 mm.). | 760 mm. 670. |
| 70% | Vacuum Assay 990 (Cor. to 760 mm.). | Cracked at atmospheric pressure—53% overhead. |
| 80% | Cracked in Vacuo at 0.80 mm. pressure— between 60% and 70% overhead. | |
| 90% | | |
| E. P | | |

¹ This sample was No. 13 shown in Table I.

The data presented in Table II demonstrates quite clearly that treatment of hydrocarbon mixtures containing asphalt with small amounts of a precipitant such as hydrogen fluoride improves the quality of the material particularly in the instance of heavy crude petroleums. For example, one treatment of Wyoming Black crude reduced the carbon residue to about one half the original. In addition, the susceptibility to distillation was vastly improved. While the untreated crude cracked under 0.80 millimeter pressure at a temperature equivalent to 990° F. at between 60% and 70% overhead, the treated "raffinate" when distilled at atmospheric pressure cracked at 53% overhead at a temperature in excess of 670° F. As those skilled in the art will appreciate, the untreated Wyoming Crude could not be cracked in a practical industrial operation with satisfactory results although the deasphalted "raffinate" could be. In other words, deasphalting by the present process would eliminate a distillation in the treatment of such a crude as Wyoming Black crude with the consequent improvement in operations from technical and economical aspects. If it is desirable to reduce the sulfur content of the deasphalted raffinate this may be done in accordance with the principles of the process disclosed in the copending applications filed in the U. S. Patent Office on August 17, 1944, Serial Numbers 549,964 and 549,965, in the names of R. C. Moran and J. R. Meadow, and that filed on September 26 1944, Serial Number 555,891, in the name of J. R. Meadow, which applications are now abandoned.

The present method of deasphalting hydrocarbon mixtures has been used to deasphalt crudes of other types and various petroleum fractions. Typical of these other hydrocarbon mixtures are West Texas sour crude, West Coast mixed crude, and Oklahoma City residuum or a "lube" stock from Oklahoma City crude.

The amount of hydrogen fluoride and the amount of diluent employed, the amount of asphalt, the amount of raffinate, the sulfur content of the raffinate and the conditions under which the hydrocarbon mixtures were treated are all set forth in the data of Table III. In the case of lube stocks, such as the Oklahoma City residuum, the use of slightly elevated temperatures seems desirable.

TABLE III
Asphalt removal from other crudes

| Test Number | Gms. HF/100 cc. Crude Oil | Vol. Per cent HF | Raffinate | | Asphalt | | Sulfur Content of Raffinate, Wt. Per cent | A. P. I. Gravity of Raffinate |
|---|---|---|---|---|---|---|---|---|
| | | | Vol. Per cent | Wt. Per cent | Vol. Per cent | Wt. Per cent | | |
| 1 | None | None | 100 | 100 | | | 2.09 | 31.2 |
| 2 | 1.87 | 1.89 | 85.2 | 84.2 | 14.8 | 15.8 | 1.80 | 32.4 |
| 3 | None | None | 100 | 100 | | | 4.82 | 14.8 |
| 4 | 9.60 | 9.73 | 48.9 | 46.2 | 51.1 | 53.8 | 3.95 | 23.3 |
| 5 | None | None | 100 | 100 | | | | 21.7 |
| 6 | 2.28 | 2.30 | 93.3 | 93.0 | 6.7 | 7.0 | | 22.3 |
| 7 | 2.70 | 2.74 | 92.9 | 92.3 | 7.1 | 7.7 | | 22.7 |

Test 1: Untreated crude oil of West Texas type.
Test 2: Crude oil of the West Texas type; asphalt coagulated at room temperature, no diluent added.
Test 3: Untreated Santa Maria crude oil.
Test 4: Santa Maria crude oil coagulated at room temperature with 120 volume per cent petroleum ether used as diluent.
Test 5: Untreated Oklahoma City "lube" stock or residuum.
Test 6: Oklahoma City "lube" stock or residuum coagulated at 100° C. during 1.5 hours, no diluent added.
Test 7: Same oil treated under the same conditions as in test 6.

To illustrate the effect upon the properties of a West Texas sour crude of this deasphalting treatment the following data are presented:

TABLE IV
Comparison of data on Slaughter-Duggan crude before and after asphalt coagulation

| | Untreated Slaughter-Duggan Crude | Slaughter-Duggan After Asphalt Removal |
|---|---|---|
| Experiment No | Original Oil | SD-1 |
| A. P. I. Gravity | 31.2 | 32.4 |
| Specific Gravity | 0.8697 | 0.8633 |
| Sulfur Content, Wt. Per cent | 2.09 | 1.80 |
| Carbon Residue, Wt. Per cent | 3.8 | 2.2 |

The present invention has been disclosed with the aid of certain illustrative examples of the application of the principles thereof. These examples are for the guidance of those skilled in the art in the application of the principles set forth and are not limiting. Since many modifications and variations of the principles of the present invention within the scope of the specification will occur to those skilled in the art such variations and modifications are to be considered within the purview and scope of the specification and the appended claims. Thus, for example, the "raffinate" can be treated a second or third time with small but effective amounts of the flocculating agent and the asphalt separated from the "raffinate" after each treatment. Likewise, the flocculating agent recovered from the asphalt may be used with the inert gas or separated from the inert gas to deasphalt further amounts of hydrocarbon mixture. Hydrogen chloride or hydrochloric acid in gaseous or liquid form and hydrogen fluoride or hydrofluoric acid are illustrative of the agents which are included within the scope of the term flocculating agent. In other words, the hydrogen halides are suitable treating agents. Furthermore, the term asphalt has been used heretofore and will be used in the claims to designate asphaltenes and resins primarily in accordance with the definitions provided hereinbefore and taken from Abraham and Kalichevsky and Stagner.

We claim:

1. A method for recovering asphalt in a form readily dispersed in crude petroleum which comprises intimately mixing petroleum oil containing asphalt and sulphur with less than about 5 volume % but sufficient hydrogen fluoride to precipitate a substantial portion of said asphalt but only a minor portion of said sulfur while maintaining a single liquid phase, separating said precipitated asphalt, and passing an inert gas through said asphalt while in the molten state.

2. A method for recovering asphalt as set forth and described in claim 1 in which the asphalt and entrained hydrogen fluoride are heated in a vacuum to evaporate hydrogen fluoride.

3. A method for recovering asphalt in a form readily dispersed in crude petroleum which comprises intimately mixing petroleum oil containing asphaltenes and resins with less than about five volume per cent but sufficient hydrogen fluoride to precipitate a substantial portion of said asphaltenes and resins, separating said precipitated asphaltenes and resins and passing an inert gas through said precipitated asphaltenes and resins while in the molten state.

JACOB R. MEADOW.
EBENEZER EMMET REID.

REFERENCES CITED

The following references are of record in the file of this patent:

UNITED STATES PATENTS

| Number | Name | Date |
|---|---|---|
| 2,247,375 | Hersberger | July 1, 1941 |
| 2,310,812 | Schick | Feb. 9, 1943 |
| 2,320,629 | Matuszak | June 1, 1943 |
| 2,366,743 | Matuszak | Jan. 9, 1945 |
| 2,343,841 | Burk | Mar. 9, 1944 |

FOREIGN PATENTS

| Number | Country | Date |
|---|---|---|
| 292,932 | Great Britain | May 23, 1929 |